US012190343B2

(12) United States Patent
Atwood et al.

(10) Patent No.: US 12,190,343 B2
(45) Date of Patent: Jan. 7, 2025

(54) PASSIVE USER-GENERATED COUPON SUBMISSION

(71) Applicant: Capital One Services, LLC, McLean, VA (US)

(72) Inventors: Brian Atwood, Austin, TX (US); Ryan Engle, Austin, TX (US); Jonathan Coon, Austin, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/346,583

(22) Filed: Jul. 3, 2023

(65) Prior Publication Data
US 2023/0351430 A1 Nov. 2, 2023

Related U.S. Application Data

(63) Continuation of application No. 18/049,500, filed on Oct. 25, 2022, now Pat. No. 11,748,775, which is a continuation of application No. 17/400,966, filed on Aug. 12, 2021, now Pat. No. 11,507,969, which is a continuation of application No. 15/898,435, filed on Feb. 17, 2018, now Pat. No. 11,120,461, which is a continuation-in-part of application No. 15/677,951, filed on Aug. 15, 2017, now Pat. No. 11,068,921.
(Continued)

(51) Int. Cl.
G06Q 30/00 (2023.01)
G06Q 30/0207 (2023.01)
H04L 67/10 (2022.01)

(52) U.S. Cl.
CPC ..... *G06Q 30/0222* (2013.01); *G06Q 30/0239* (2013.01); *H04L 67/10* (2013.01)

(58) Field of Classification Search
CPC .................................................. G06Q 30/024
See application file for complete search history.

(56) References Cited

U.S. PATENT DOCUMENTS 7,437,468 B2 10/2008 Yamamoto et al.
8,065,195 B2 11/2011 Tarvydas et al.
8,538,827 B1 9/2013 Dryer et al.
(Continued)

FOREIGN PATENT DOCUMENTS

WO 2008121737 10/2008
WO 2009061399 5/2009
(Continued)

OTHER PUBLICATIONS

Schultz, "NBA Data Scraping—Game Data", 2015 (Year: 2015).*
(Continued)

*Primary Examiner* — Tarek Elchanti
(74) *Attorney, Agent, or Firm* — Bookoff McAndrews, PLLC

(57) ABSTRACT

Successful application of a coupon code on an e-commerce website is detected via network request tracking and page data tracking. Upon coupon application, the coupon code is stored, for example in a server-based database. The coupon code is then automatically applied to subsequent e-commerce purchases whose parameters match the requirements for the coupon. The coupon can be automatically applied to purchases made by the same user and/or other users, as applicable.

20 Claims, 3 Drawing Sheets

Related U.S. Application Data which is a continuation-in-part of application No. 14/933,173, filed on Nov. 5, 2015, now abandoned.

(60) Provisional application No. 62/462,629, filed on Feb. 23, 2017, provisional application No. 62/462,521, filed on Feb. 23, 2017, provisional application No. 62/376,243, filed on Aug. 17, 2016, provisional application No. 62/238,565, filed on Oct. 7, 2015, provisional application No. 62/238,574, filed on Oct. 7, 2015, provisional application No. 62/174,846, filed on Jun. 12, 2015, provisional application No. 62/075,903, filed on Nov. 6, 2014.

(56) References Cited

U.S. PATENT DOCUMENTS

| | | |
|---|---|---|
| 8,577,749 B2 | 11/2013 | Aliabadi et al. |
| 8,600,931 B1 | 12/2013 | Wehrle et al. |
| 8,775,275 B1 | 7/2014 | Pope |
| 8,881,303 B2 | 11/2014 | Liu et al. |
| RE45,371 E | 2/2015 | Simons |
| 9,189,811 B1 | 11/2015 | Bhosle et al. |
| 9,626,688 B2 | 4/2017 | King |
| 9,639,853 B2 | 5/2017 | Shiffert et al. |
| 9,766,922 B2 | 9/2017 | Amershi et al. |
| 9,798,528 B2 | 10/2017 | Gao et al. |
| 9,892,099 B2 | 2/2018 | Cao |
| 9,922,327 B2 | 3/2018 | Johnson et al. |
| 9,953,335 B2 | 4/2018 | Shiffert et al. |
| 9,965,769 B1 | 5/2018 | Shiffert et al. |
| 10,346,847 B2 | 7/2019 | Crawford |
| 2002/0087883 A1 | 7/2002 | Wohlgemuth et al. |
| 2002/0116531 A1 | 8/2002 | Chu |
| 2005/0165789 A1 | 7/2005 | Minton et al. |
| 2006/0190330 A1 | 8/2006 | Tollinger et al. |
| 2006/0242266 A1 | 10/2006 | Keezer et al. |
| 2007/0043879 A1 | 2/2007 | Vidya Sagar |
| 2007/0180380 A1 | 8/2007 | Khavari et al. |
| 2008/0005079 A1 | 1/2008 | Flake et al. |
| 2008/0046331 A1 | 2/2008 | Rand |
| 2008/0098300 A1 | 4/2008 | Corrales et al. |
| 2008/0189190 A1 | 8/2008 | Ferber |
| 2009/0182643 A1 | 7/2009 | Holstein et al. |
| 2009/0265257 A1 | 10/2009 | Klinger et al. |
| 2009/0313352 A1 | 12/2009 | Dupont |
| 2010/0121810 A1 | 5/2010 | Bromenshenkel et al. |
| 2010/0241518 A1 | 9/2010 | McCann |
| 2010/0312632 A1 | 12/2010 | Cervenka |
| 2011/0088036 A1 | 4/2011 | Patanella |
| 2011/0136516 A1 | 6/2011 | Ellis |
| 2011/0238479 A1 | 9/2011 | Bova |
| 2012/0011431 A1 | 1/2012 | Mao |
| 2012/0198342 A1 | 8/2012 | Mahmud |
| 2012/0215611 A1 | 8/2012 | Korson et al. |
| 2012/0265637 A1 | 10/2012 | Moeggenberg |
| 2013/0085807 A1 | 4/2013 | Cincotta |
| 2013/0117094 A1 | 5/2013 | Jones et al. |
| 2013/0151381 A1 | 6/2013 | Klein |
| 2013/0185126 A1 | 7/2013 | Stefanescu |
| 2013/0191723 A1 | 7/2013 | Pappas et al. |
| 2014/0052517 A1 | 2/2014 | Munjal |
| 2014/0100991 A1 | 4/2014 | Lenahan et al. |
| 2014/0122203 A1 | 5/2014 | Johnson et al. |
| 2014/0188551 A1 | 7/2014 | Westphal |
| 2014/0229258 A1 | 8/2014 | Seriani |
| 2014/0229335 A1 | 8/2014 | Chen |
| 2014/0244429 A1 | 8/2014 | Clayton et al. |
| 2014/0281918 A1 | 9/2014 | Wei et al. |
| 2014/0325337 A1 | 10/2014 | McWeeney |
| 2015/0100688 A1 | 4/2015 | Richardson et al. |
| 2015/0142543 A1 | 5/2015 | Lellouche |
| 2015/0235304 A1 | 8/2015 | Vincent |
| 2015/0287047 A1 | 10/2015 | Situ et al. |
| 2015/0379618 A1 | 12/2015 | Neumann |
| 2016/0005067 A1* | 1/2016 | Warner .............. G06Q 30/0226 705/14.27 |
| 2016/0063595 A1 | 3/2016 | Oral et al. |
| 2016/0110767 A1 | 4/2016 | Bax et al. |
| 2016/0191351 A1 | 6/2016 | Smith et al. |
| 2017/0103102 A1 | 4/2017 | Alison et al. |
| 2017/0104841 A1 | 4/2017 | Duke et al. |
| 2017/0171311 A1 | 6/2017 | Tennie et al. |
| 2017/0277764 A1 | 9/2017 | Osotio |
| 2018/0089737 A1 | 3/2018 | Ali et al. |
| 2018/0189806 A1* | 7/2018 | Fordyce .............. G06Q 20/384 |

FOREIGN PATENT DOCUMENTS

| | | |
|---|---|---|
| WO | 2017062678 A1 | 4/2017 |
| WO | 2017062680 A1 | 4/2017 |

OTHER PUBLICATIONS

Schultz, "NBA Data Scraping—Game Data", 2015.
Reda, "Web Scraping 201: Finding the API", 2015.
Moore, "Nylon Calculus 101: Data Scraping with Python", 2015.
Oliver, R.L. and Shor, M. "Digital redemption of coupons: satisfying and dissatisfying effects of promotion codes", Journal of Product & Brand Management, vol. 12 No. 2, pp. 121-134. (Year: 2003).
Oliver, Richard L., and Mikhael Shor "Digital Redemption of Coupons: Customer Perceptions of Satisfying and Dissatisfying Price Discrimination", Working Paper, Nashville, 2002 (30 pages).

* cited by examiner

PASSIVE USER-GENERATED COUPON SUBMISSION

CROSS-REFERENCE TO RELATED APPLICATIONS

The present application is a continuation of U.S. patent application Ser. No. 18/049,500, entitled "Passive User-Generated Coupon Submission," filed Oct. 25, 2022, which is a continuation of U.S. patent application Ser. No. 17/400,966, entitled "Passive User-Generated Coupon Submission," filed Aug. 12, 2021, which is a continuation of U.S. patent application Ser. No. 15/898,435, entitled "Passive User-Generated Coupon Submission," filed Feb. 17, 2018, which claims the benefit of U.S. Provisional Application No. 62/462,629, entitled "Passive User-Generated Coupon Submission," filed Feb. 23, 2017, which is incorporated by reference herein in its entirety.

U.S. patent application Ser. No. 15/898,435 further claims the benefit of U.S. Provisional Application No. 62/462,521, entitled "Product-Based Simultaneous Coupon Testing," filed Feb. 23, 2017, which is incorporated by reference herein in its entirety.

U.S. patent application Ser. No. 15/898,435 further claims priority as a continuation-in-part of U.S. patent application Ser. No. 15/677,951, entitled "Automated Testing of Multiple Online Coupons," filed Aug. 15, 2017, which is incorporated by reference herein in its entirety.

U.S. patent application Ser. No. 15/677,951 claims the benefit of U.S. Provisional Application No. 62/376,243, entitled "Automated Testing of Multiple Online Coupons," filed Aug. 17, 2016, which is incorporated by reference herein in its entirety.

U.S. patent application Ser. No. 15/677,951 further claims the benefit of U.S. Provisional Application No. 62/462,521 entitled "Product-Based Simultaneous Coupon Testing," filed Feb. 23, 2017, which is incorporated by reference herein in its entirety.

U.S. patent application Ser. No. 15/677,951 further claims priority as a continuation-in-part of U.S. patent application Ser. No. 14/933,173, entitled "Universal Electronic Shopping Cart," filed Nov. 5, 2015, which is incorporated by reference herein in its entirety.

U.S. patent application Ser. No. 14/933,173 claims the benefit of U.S. Provisional Application No. 62/075,903 entitled "Universal E-Shopping Cart," filed Nov. 6, 2014, which is incorporated by reference herein in its entirety.

U.S. patent application Ser. No. 14/933,173 further claims the benefit of U.S. Provisional Application No. 62/174,846 entitled "Universal E-Shopping Cart Enhancements," filed Jun. 12, 2015, which is incorporated by reference herein in its entirety.

U.S. patent application Ser. No. 14/933,173 further claims the benefit of U.S. Provisional Application No. 62/238,565, entitled "Browserless Extraction of Data from Web Pages," filed Oct. 7, 2015, which is incorporated by reference herein in its entirety.

U.S. patent application Ser. No. 14/933,173 further claims the benefit of U.S. Provisional Application No. 62/238,574, entitled "Automated Browserless Sequential Site Navigation," filed Oct. 7, 2015, which is incorporated by reference herein in its entirety.

TECHNICAL FIELD

The present document relates to techniques for automatically storing coupon codes based on successful activation, and for automatically applying stored coupon codes for subsequent purchases across users.

DESCRIPTION OF THE RELATED ART

Online shoppers are often interested in finding coupon codes and promotional codes that will maximize their savings on online purchases. Such coupon codes can typically be found at a number of different websites and are available from a number of different sources, causing diligent shoppers to have to search for such coupons in many places. Often, some coupons may be invalid or may have expired before use, or may have restrictions preventing their use for a particular purchase. Seeking out coupons from various sources, testing such coupons on a particular order, and keeping track of which coupons are valid and usable, can be cumbersome and unreliable. As a result, many users fail to obtain the best prices on items they purchase online.

SUMMARY

According to various embodiments, successful application of a coupon code is detected via network request tracking and page data tracking. Upon coupon application, the coupon code is stored, either locally or in a server-based database. The coupon code is then automatically applied to subsequent e-commerce purchases whose parameters match the requirements for the coupon. The coupon can be automatically applied to purchases made by the same user and/or other users, as applicable.

The described techniques can be used in the context of a universal electronic shopping cart, as described in the above-referenced U.S. Utility application Ser. No. 14/933,173, so as to store and/or apply coupons in connection with purchases made using the universal cart. Alternatively, the described techniques can be implemented in other contexts.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION

The various concepts, architectures, methods, and modes of operation described herein are intended as illustrative examples that can be implemented singly or in any suitable combination with one another. Some may be omitted and others included, as suitable for various embodiments. Accordingly, the following description and accompanying Figures merely set forth a subset of the possible embodiments, and are not intended to limit scope.

System Architecture

According to various embodiments, the system can be implemented on any electronic device or devices equipped to receive, store, and present information. Such electronic devices may include, for example, desktop computers, laptop computers, smartphones, tablet computers, smart watches, wearable devices, and/or the like.

Although the system is primarily described herein in connection with an implementation in a client/server context wherein the client is a computer, one skilled in the art will recognize that the techniques described herein can be implemented in other contexts, and indeed in any suitable device capable of receiving and/or processing user input, and/or communicating with other components over an electronic network. Accordingly, the following description is intended to illustrate various embodiments by way of example, rather than to limit scope.

Figure 1:
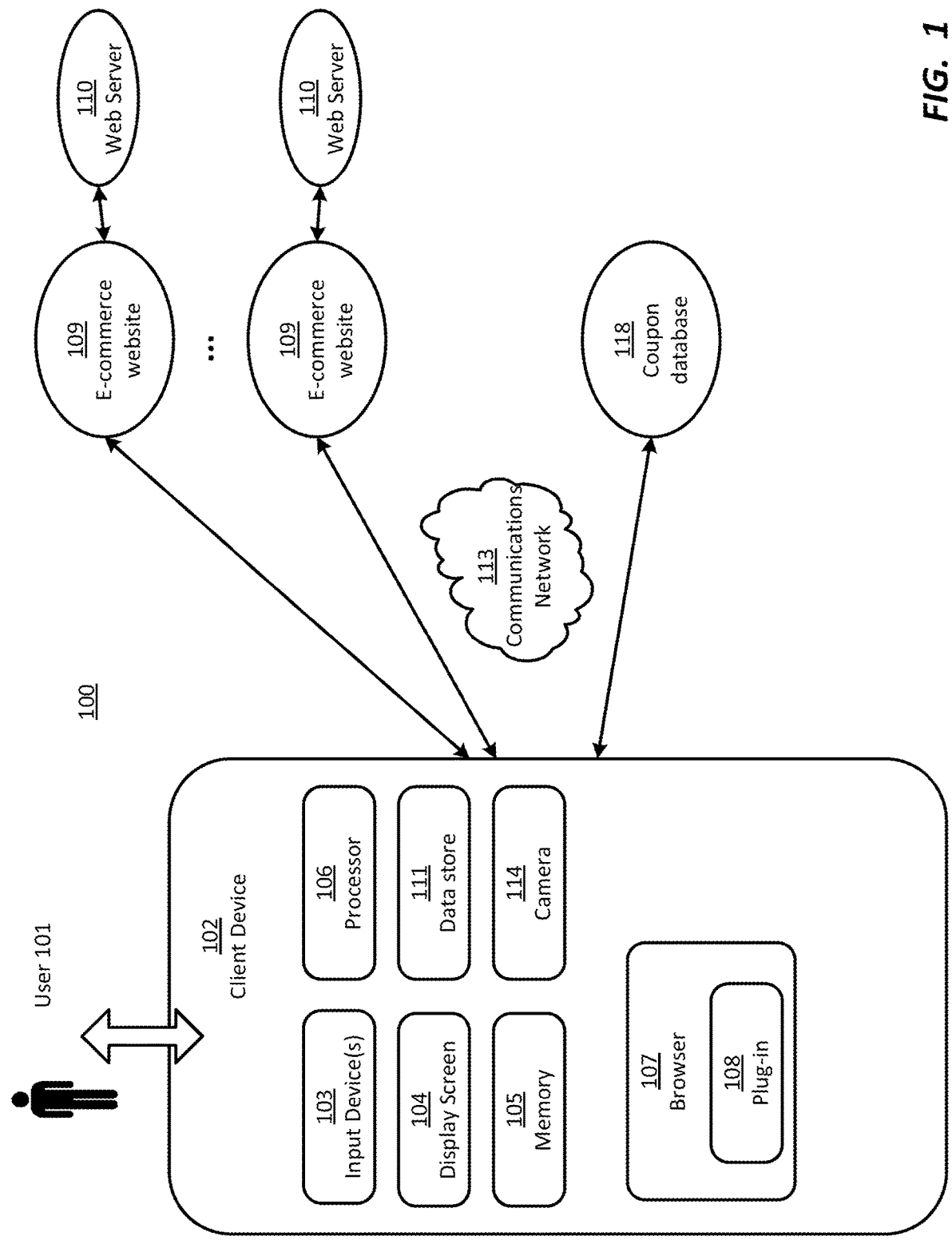
FIG. 1 is a block diagram depicting a system for automatically storing coupon codes based on successful activation, and for automatically applying stored coupon codes for subsequent purchases, according to one embodiment.

Referring now to FIG. 1, there is shown a block diagram depicting a system 100 for automatically storing coupon codes based on successful activation, and for automatically applying stored coupon codes for subsequent purchases, according to one embodiment. As shown in FIG. 1, in at least one embodiment, the system is implemented in a client/server environment wherein at least one web server 110 receives and responds to requests from client device 102.

Client device 102 may be any electronic device equipped to receive, store, and/or present information, and to receive user input in connect with such information, such as a desktop computer, laptop computer, personal digital assistant (PDA), cellular telephone, smartphone, music player, handheld computer, tablet computer, kiosk, game system, smart watch, wearable device, or the like.

In at least one embodiment, client device 102 includes a number of hardware components well known to those skilled in the art.

Input device(s) 103 can be any element or elements capable of receiving input from user 101, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech.

Processor 106 can be a conventional microprocessor for performing operations on data under the direction of software, according to well-known techniques.

Memory 105 can be random-access memory, having a structure and architecture as are known in the art, for use by processor 106 in the course of running software.

Browser 107 is an example of a software application that can be used by user 101 to access and interact with websites over communications network 113. In at least one embodiment, user 101 uses browser 107 to view and interact with e-commerce websites 109 operated by web servers 110. Such inter-action can include, for example, clicking on links to view items, placing items in a shopping cart, and/or the like. In other embodiments, any suitable app (software application) or other component can be used in place of browser 107.

In at least one embodiment, as described in more detail below, plug-in 108 automatically detects entry of coupon codes, either by user 101 or automatically, and monitors success or failure of such coupons in connection with e-commerce transactions. In other embodiments, plug-in 108 can be omitted, and the functionality described herein and associated with plug-in 108 can instead be performed by browser 107 itself, or any app (software application) or other component of client device 102.

Display screen 104 can be any element that graphically displays information such as items presented by browser 107, user interface elements, and/or the like. Such output may include, for example, descriptions and images depicting items that user 101 may be interested in purchasing, indications of coupons and discounts, navigational elements, search results, graphical elements, prompts, windows, buttons, forms, and/or the like. In at least one embodiment where only some of the desired output is presented at a time, a dynamic control, such as a scrolling mechanism, may be available via input device 103 to change which information is currently displayed, and/or to alter the manner in which the information is displayed.

In at least one embodiment, the information displayed on display screen 104 may include data in text and/or graphical form.

Data store 111 can be any magnetic, optical, or electronic storage device for data in digital form; examples include flash memory, magnetic hard drive, CD-ROM, DVD-ROM, thumbdrive, or the like. Data store 111 may be fixed or removable.

In at least one embodiment, device 102 can include additional components. For example, a camera 114 can be included, as is well known for devices such as smartphones.

Additional input mechanisms, sensors, and/or devices can also be included in device 102, such as a speaker (for voice commands), accelerometer (to detect shaking and changes in position or orientation), GPS sensor (to detect location), and/or the like.

As mentioned above, FIG. 1 depicts an example of a system implementation in a client/server environment. An example of such a client/server environment is a web-based implementation, wherein client device 102 runs browser 107 that provides a user interface for interacting with e-commerce web pages 109 and/or other web-based resources. Plug-in 108 also monitors coupon usage, determines success or failure of attempted coupon use, and stores information about valid coupons in coupon database 118, which may be in local or remote data storage.

Information, images, and/or text from e-commerce websites 109 can be presented as part of such web pages and/or other web-based resources, using known protocols and languages such as Hypertext Markup Language (HTML), Java, JavaScript, and the like. Alternatively, such information, images, and/or text from e-commerce websites 109 can be presented in a software application (app) or other component running on client device 102.

In at least one embodiment, plug-in 108 or other software application runs in the background no matter what browser or application user 101 is running. The background application can thereby see all traffic, and in particular can alert user 101 to savings, and/or can automatically present and/or apply coupons to items of interest to user 101.

Any suitable type of communications network 113, such as the Internet, can be used as the mechanism for transmitting data among components such as client device 102, web server(s) 110, e-commerce website(s) 109, and coupon database 118, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. Communications network 113 can be wired or wireless, or any combination thereof.

Communications across network 113 can be encrypted or unencrypted. In at least one embodiment, client device 102 transmits requests for data via communications network 113, and receives responses from servers 110 and/or websites 109 containing the requested data.

In at least one embodiment, some components of system 100 can be implemented as software written in any suitable computer programming language. Alternatively, such components may be implemented and/or embedded in hardware.

Method

The described techniques can be used in connection with a universal electronic shopping cart, as described in above-referenced U.S. Utility application Ser. No. 14/933,173, as well as in connection with techniques for automated testing of multiple online coupons, as described in above-referenced U.S. Utility application Ser. No. 15/677,951. Alternatively, the described techniques can be implemented in other contexts.

In at least one embodiment, the described steps can be performed by client-side plug-in 108. Alternatively, they can be performed by native functionality of browser 107, or by a server such as one of web servers 110. Coupon database 118, containing information about valid coupons, can be implemented locally or remotely with respect to client device 102. In at least one embodiment, coupon database 118 can be accessed by other client devices as well.

Storing Coupons Based on Successful Activation

Figure 2:
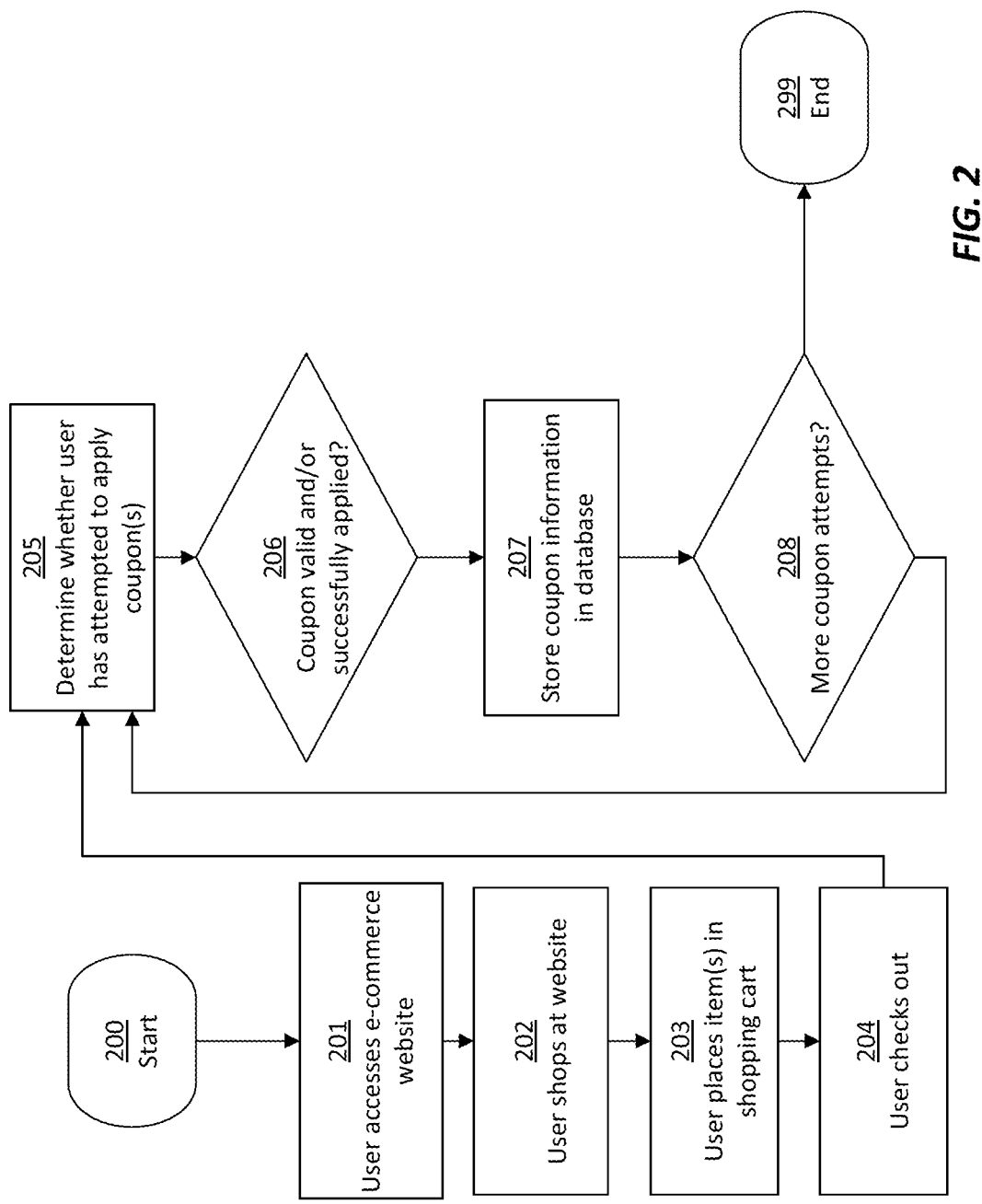
FIG. 2 is a flowchart depicting a method for automatically storing coupon codes based on successful activation, according to one embodiment.

Referring now to FIG. 2, there is shown a flowchart depicting a method for automatically storing coupon codes based on successful activation, according to one embodiment. Although described herein in terms of tangible goods, the system and method can be implemented for any type of online purchases, including for example services, travel, event tickets, media and entertainment content, and/or the like.

In at least one embodiment, the method depicted in FIG. 2 can be performed using the architecture depicted in FIG. 1. However, one skilled in the art will recognize that the method can be performed using other architectures and arrangements.

In at least one embodiment, the described method is performed in connection with e-commerce shopping.

The method begins 200. User 101 accesses 201 an e-commerce website 109, for example via browser 107 or via an app running on device 102. User 101 shops 202 normally at website 109, and places 203 items in a shopping cart. The shopping cart may be a cart for an e-commerce website 109 or may be a universal shopping cart as described in the above-referenced U.S. Utility application.

Once the items have been placed in the cart, user 101 can apply coupons by entering coupon codes, scanning QR codes, or providing other input. Alternatively, in at least one embodiment, the system can automatically find and apply coupons that are applicable to the products that user 101 is purchasing, for example using techniques described in the above-cited related applications.

User 101 then indicates 204 that he or she wishes to check out, according to known techniques.

While user 101 is completing the checkout process, plug-in 108 (or some other component) monitors requests and page data to determine 205 whether user 101 has attempted to apply any coupons to the purchase, and to determine whether the application of the coupon was a success or failure. In at least one embodiment, step 205 is performed by plug-in 108 monitoring communications sent from web server 110 to client device 102 in response to an attempt to apply a coupon, and determining whether the response from web server 110 indicates successful application of the coupon.

If plug-in 108 determines 206 that the coupon is valid (and/or that application of the coupon is successful in connection with the purchase), it causes information about the coupon to be stored 207 in database 118. Such information can include, for example, a coupon code, time and date, particulars of the item being purchased, cart total, geographic location, and/or the like. In at least one embodiment, step 207 is performed by sending the coupon information to a server (not shown), which stores the coupon information in a data store that includes database 118. In other embodiments, the data can be stored locally or in some other location.

In at least one embodiment, statistics regarding usage of the coupon code, and its success and/or failure rate, are also stored in database 118.

In at least one embodiment, a user identifier is stored in database 118, which can be used to reference a user data table containing information about the user, such as his or her location, demographic information, and/or the like. The user identifier can also be used to de-duplicate submissions.

In at least one embodiment, if no record for a particular coupon exists in the database when step 207 is performed, a new record is created and usage statistics are stored in the new record. If a record for the coupon already exists when step 207 is performed, the existing record is updated to reflect new statistics for the coupon.

In step 208, plug-in 108 determines whether any more attempts have been made to apply coupons to the current purchase. If so, plug-in 108 returns to step 205. Otherwise, the method ends 299.

In at least one embodiment, steps 205 through 208 are performed automatically, without user 101 activating the method or taking any particular action, or they can be performed in response to user 101 action such as hitting a button or activating an on-screen control cause a coupon to be stored.

In at least one embodiment, coupon data stored in database 118 can be made available to other client devices 102. Thus, information about a valid and/or successfully applied coupon can be made available automatically when other users attempt purchases at the same website or other related websites, and when it is determined that the coupons can be applied to such purchases.

In at least one embodiment, the depicted method can be optionally combined with automatic coupon testing, such as described in the above-referenced related applications. For example, coupon data can be automatically retrieved from coupon database 118 when a purchase is made or when a user browses a web page, as depicted in FIG. 3.

Figure 3:
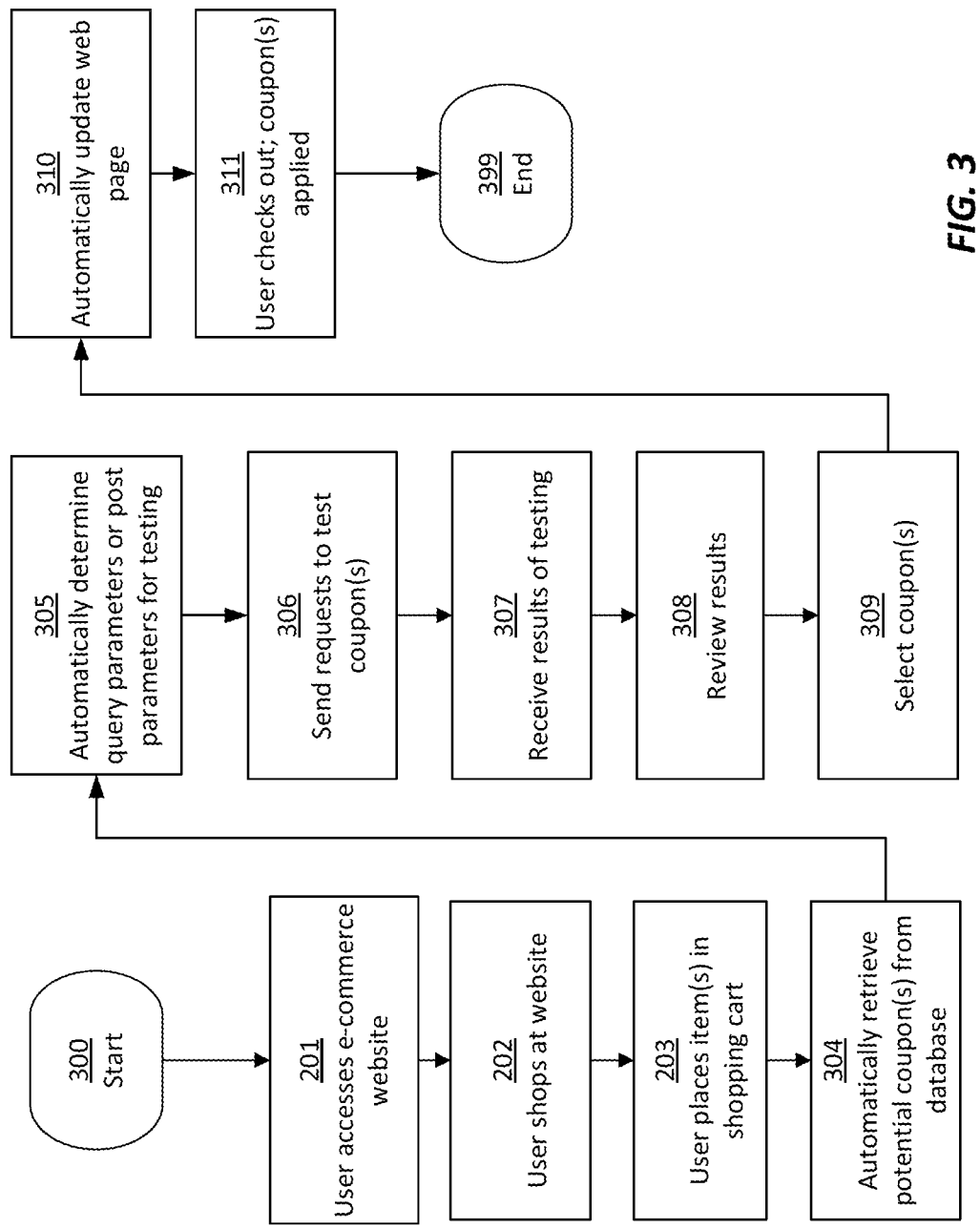
FIG. 3 is a flowchart depicting a method for automatically applying a stored coupon code on a subsequent purchase, according to one embodiment.

Referring now to FIG. 3, there is shown a flowchart depicting a method for automatically applying a stored coupon code on a subsequent purchase, according to one embodiment. The method of FIG. 3 can be used to automatically apply coupons that were stored in database 118 during purchases by the same user 101 or a different user.

The method begins 300. Steps 201 through 203 are performed as described above in connection with FIG. 2. In step 304, plug-in 108 automatically obtains potential coupons from database 118, based on the item(s) in the shopping cart. In at least one embodiment, this is done by retrieving coupons applicable to the e-commerce website 109 being accessed, and running those coupons through a scoring algorithm that considers factors such as the last time the coupon was successful, the success rate, and the number of attempts. The algorithm takes into account what specific items are in user's 101 shopping cart, based on any or all of specific item SKU, brand, model, the seller of the item, and/or the price of the item. In at least one embodiment, a model is applied that takes into consideration which coupons work with which items and thereby predicts whether a coupon will work for a particular item. Notably, coupons retrieved from database 118 in step 304 may include coupons that were previously stored by the same client device 102 in connection with purchases made by the same user 101, and/or coupons stored by other client device(s) in connection with purchases made by other users.

Plug-in 108 then automatically determines 305 query parameters or post parameters to test each individual potential coupon for the e-commerce website 109 being accessed. The query parameters are then used to send 306 requests to web server 110 for the e-commerce website 109 at which user 101 is shopping, so as to test each potential coupon. In at least one embodiment, this includes repeatedly and automatically rewriting a network request to web server 110 to test each specific coupon, with a coupon parameter being swapped out to match the particular coupon being tested. In at least one embodiment, multiple coupon requests are run sequentially. Alternatively, they can be run in parallel with one another.

Web server 110 responds 307 with an indicator of validity or invalidity for each tested coupon, and, for each valid coupon, an indicator of how much would be saved by using the coupon. Once such responses are received, plug-in 108 automatically reviews 308 the responses to determine which coupons worked and how much discount is available using each coupon. In some cases, multiple coupons may apply; accordingly, plug-in 108 can be configured to automatically test various combinations of coupons in parallel. Based on this analysis, plug-in 108 selects 309 a coupon or combination of coupons.

The web page from website 109 is then automatically updated 310, for example, by performing a refresh or by running a JavaScript command to cause browser 107 to redraw the webpage to indicate any coupon or coupons that worked. In at least one embodiment, the working coupon(s) is/are automatically applied. User 101 can then check out 311 and thereby purchase the item(s) using the applied coupon(s). Alternatively, user 101 can perform other actions, such as deleting or modifying automatically selected coupons, removing or adding to items in the cart, canceling the transaction, and/or the like. In at least one embodiment, the working coupon(s) is/are automatically applied and the purchase is automatically completed, without the need for user 101 to manually check out.

In at least one embodiment, the described steps are performed with respect to a plurality of items in user's 101 shopping cart. By considering the plurality of items, rather than individual items separately, the system is able to take into account, for example, minimum purchase requirements for coupons and/or other factors that may affect validity or applicability of coupons to the items of interest to user 101.

In at least one embodiment, the system operates in a manner that does not require any intervention by user 101, and does not require that user 101 know coupon codes, URL's for coupon websites, or any other information about potential coupons. In this manner, the system runs behind the scenes, via plugin 108 (or other component) and using network requests, so as to automatically seek out and apply valid, working coupons without interfering with user's 101 behavior, and without interfering with display of the e-commerce web page as coupons are being tested.

In at least one embodiment, as described above, the system can be implemented using client-side plug-in 108. Alternatively, it can be implemented using a browser 107 extension, or native functionality of client device 102. Alternatively, it can be implemented server-side, for example by passing user's 101 cookie to a server and running requests without the use of browser 107.

In an alternative embodiment, previously stored coupons can be tested while user 101 is browsing a product page, before he or she places items in the cart. Techniques for performing such testing are described in the above-cited U.S. Utility application Ser. No. 15/677,951.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in at least one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within the memory of a computing device. These algorithmic descriptions and representations are the means used by those skilled in the data processing arts to most effectively con-vey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. The program and its associated data may also be hosted and run remotely, for example on a server.

Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a desktop computer, laptop computer, television, smartphone, tablet, music player, audio device, kiosk, set-top box, game system, wearable device, consumer electronic device, server computer, and/or the like. An electronic device may use any operating system such as, for example and without limitation: Linux; Microsoft Windows, available from Microsoft Corporation of Redmond, Washington; Mac OS X, available from Apple Inc. of Cupertino, California; iOS, available from Apple Inc. of Cupertino, California; Android, available from Google, Inc. of Mountain View, California; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method, comprising:
   receiving, at a first online session, user input indicating user interest in an item offered by an online merchant;
   automatically retrieving, from a data store, at least one potential online coupon for the item or the online merchant by:
      accessing the data store to retrieve coupons applicable to the item or the online merchant, wherein the coupons are stored in the data store based on at least one monitored online session; and
      processing the coupons through a predictive algorithm to obtain the at least one potential online coupon, of the coupons, by evaluating a likelihood of success of the at least one potential online coupon for the item or the online merchant, based on considering one or more factors associated with the at least one potential online coupon; and
   automatically applying the at least one potential online coupon to an online shopping cart.

2. The computer-implemented method of claim 1, wherein the coupons retrieved from the data store include:
   previously stored coupons that were previously stored in connection with purchases made by the user, or
   other coupons stored in connection with purchases made by other users.

3. The computer-implemented method of claim 1, wherein automatically applying the at least one potential online coupon to the online shopping cart includes:
   repeatedly rewriting network request(s) to test each of the coupons, by swapping out a coupon parameter to match a coupon being tested;
   receiving responses to the network request(s), the responses including an indicator of validity or invalidity for each coupon, and, for each valid coupon, an indicator of an amount that would be saved by using each valid coupon;
   selecting a valid coupon based on the responses; and
   automatically applying the valid coupon that was selected.

4. The computer-implemented method of claim 1, wherein the data store includes a coupon identifier for each of the coupons.

5. The computer-implemented method of claim 1, wherein the data store includes a record comprising data describing use of the coupons.

6. The computer-implemented method of claim 5, wherein the data describing the use of the coupons comprises at least one of:
a date on which one or more of the coupons were used;
a time at which the one or more of the coupons were used;
an e-commerce site at which the one or more of the coupons were used;
a product being purchased when the one or more of the coupons were used;
a total dollar amount of purchases on which the one or more of the coupons were used;
shipping information for the purchases on which the one or more of the coupons were used; or
a geographic area in which the one or more of the coupons were used.

7. The computer-implemented method of claim 5, wherein the data describing the use of the coupons comprises at least one of a success rate or a failure rate for the one or more of the coupons.

8. The computer-implemented method of claim 1, further comprising, during the at least one monitored online session:
monitoring the at least one monitored online session in connection with the item or the online merchant;
detecting an attempt to apply a coupon in connection with a purchase of at least one item by monitoring requests and page data;
determining whether the coupon is valid in connection with the purchase by determining whether a response from a web server indicates successful application of the coupon; and
responsive to a determination that the coupon is valid in connection with the purchase, storing coupon data for the coupon in the data store.

9. The computer-implemented method of claim 8, wherein the coupon data includes, for the purchase using the coupon, one or more of a coupon code, time and date of the purchase, particulars of item(s) being purchased, a cart total, or geographic location.

10. The computer-implemented method of claim 1, wherein the data store is located on one or more of a client device or on a server.

11. A computer-implemented method, comprising:
receiving, at a first online session, user input indicating user interest in an item offered by a first online merchant;
automatically retrieving, from a data store, at least one potential online coupon for the item by:
identifying a second online merchant offering the item,
accessing the data store to retrieve coupons applicable to the item, corresponding to the second online merchant, wherein the coupons are stored in the data store based on at least one monitored online session, and
processing the coupons through a predictive algorithm to obtain the at least one potential online coupon, of the coupons, evaluating a likelihood of success of the at least one potential online coupon for the item at the second online merchant, considering one or more factors associated with the at least one potential online coupon; and
automatically applying the at least one potential online coupon to an online shopping cart of the second online merchant.

12. The computer-implemented method of claim 11, further comprising providing the second online merchant offering the item to a user providing the user input after identifying the second online merchant offering the item.

13. The computer-implemented method of claim 11, wherein automatically applying the at least one potential online coupon to the online shopping cart includes:
repeatedly and automatically rewriting network request(s), to test each of the coupons, by swapping out a coupon parameter to match a coupon being tested;
receiving responses to the network request(s), the responses including an indicator of validity or invalidity for each coupon, and, for each valid coupon, an indicator of an amount that would be saved by using each valid coupon;
selecting a valid coupon based on the responses; and
automatically applying the valid coupon that was selected.

14. The computer-implemented method of claim 11, wherein the data store includes a coupon identifier for each of the coupons.

15. The computer-implemented method of claim 11, wherein the data store includes a record comprising data describing use of the coupons.

16. The computer-implemented method of claim 15, wherein the data describing the use of the coupons comprises at least one of:
a date on which the coupons were used;
a time at which the coupons were used;
an e-commerce site at which the coupons were used;
a product being purchased when the coupons were used;
a total dollar amount of purchases on which the coupons were used;
shipping information for the purchases on which the coupons were used; or
a geographic area in which the coupons were used.

17. The computer-implemented method of claim 15, wherein the data describing the use of the coupons comprises at least one of a success rate or a failure rate for the coupons.

18. The computer-implemented method of claim 11, further comprising, during at least one monitored second online session:
monitoring the at least one monitored second online session in connection with the second online merchant;
detecting an attempt to apply a coupon in connection with a purchase of at least one item by monitoring requests and page data;
determining whether the coupon is valid in connection with the purchase by determining whether a response from a web server indicates successful application of the coupon; and
responsive to a determination that the coupon is valid in connection with the purchase, storing coupon data for the coupon in the data store.

19. The computer-implemented method of claim 11, wherein the data store is located on one or more of a client device or on a server.

20. A system, comprising:
at least one memory storing instructions; and
at least one processor executing the instructions to perform operations, the operations including:
receiving, at a first online session, user input indicating user interest in an item offered by an online merchant;
automatically retrieving, from a data store, at least one potential online coupon for the item or the online merchant by:
accessing the data store to retrieve coupons applicable to the item or the online merchant wherein the coupons are stored in the data store based on at least one monitored online session, and processing the coupons through a predictive algorithm to obtain the at least one potential online coupon, of the coupons, evaluating a likelihood of success of the at least one potential online coupon for the item or the online merchant, based on considering one or more factors associated with the at least one potential online coupon; and automatically applying the at least one potential online coupon to an online shopping cart.

\* \* \* \* \*